(12) United States Patent
Trail et al.

(10) Patent No.: US 10,827,163 B2
(45) Date of Patent: *Nov. 3, 2020

(54) MULTIPLE EMITTER ILLUMINATION SOURCE FOR DEPTH INFORMATION DETERMINATION

(71) Applicant: Facebook Technologies, LLC, Menlo Park, CA (US)

(72) Inventors: Nicholas Daniel Trail, Bothell, WA (US); Renzo De Nardi, Seattle, WA (US); Richard Andrew Newcombe, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/232,073

(22) Filed: Aug. 9, 2016

(65) Prior Publication Data

US 2018/0048880 A1 Feb. 15, 2018

(51) Int. Cl.
*H04N 13/254* (2018.01)
*G06T 7/586* (2017.01)
(Continued)

(52) U.S. Cl.
CPC ....... *H04N 13/254* (2018.05); *G02B 27/0172* (2013.01); *G06F 3/011* (2013.01); *G06F 3/0304* (2013.01); *G06T 7/586* (2017.01); *H04N 5/2256* (2013.01); *H04N 5/2354* (2013.01); *H04N 13/207* (2018.05); *H04N 13/271* (2018.05);
(Continued)

(58) Field of Classification Search
CPC .. H04N 13/254; H04N 5/2354; H04N 5/2256; H04N 13/207; H04N 5/33; H04N 13/02; H04N 5/225; G02B 27/0172; G02B 27/4205; G02B 2027/0138; G06T 7/0073; G06T 2207/10028; G06T 2207/10152;
(Continued)

(56) References Cited

U.S. PATENT DOCUMENTS 7,673,803 B2 * 3/2010 Tsikos ................ G06K 7/10732
235/462.25
9,826,216 B1 * 11/2017 Hazeghi ............. G02B 27/4205
(Continued)

FOREIGN PATENT DOCUMENTS

KR 10-2015-0090778 A 8/2015

OTHER PUBLICATIONS

Princeton Optronics, Inc., "Princeton Optronics VCSEL Technology," Nov. 2012, twenty five pages. [Online] [Retrieved Nov. 11, 2012] Retrieved from the Internet <URL:http://www.princetonoptronics.com/technology/technology.php>.
(Continued)

*Primary Examiner* — Dramos Kalapodas
(74) *Attorney, Agent, or Firm* — Fenwick & West LLP

(57) ABSTRACT

A depth camera assembly (DCA) that captures data describing depth information in a local area. The DCA includes an imaging device, a controller, and an illumination source. The illumination source includes a plurality of emitters on a single substrate. The imaging device captures one or more images of the local area illuminated with the light from the illumination source. The controller determines depth information for objects in the local area using the one or more images.

10 Claims, 4 Drawing Sheets

(51) Int. Cl.
*G06F 3/01* (2006.01)
*G02B 27/01* (2006.01)
*H04N 13/207* (2018.01)
*H04N 13/366* (2018.01)
*G06F 3/03* (2006.01)
*H04N 13/344* (2018.01)
*H04N 5/235* (2006.01)
*H04N 13/271* (2018.01)
*H04N 5/225* (2006.01)

(52) U.S. Cl.
CPC ......... *H04N 13/344* (2018.05); *H04N 13/366* (2018.05); *G02B 2027/0134* (2013.01); *G02B 2027/0138* (2013.01); *G06T 2207/10028* (2013.01); *G06T 2207/10152* (2013.01)

(58) Field of Classification Search
CPC .......... G06T 7/586; G06F 3/011; G06F 3/013; G06F 3/0325
See application file for complete search history.

(56) References Cited

U.S. PATENT DOCUMENTS

| | | | | |
|---|---|---|---|---|
| 9,870,068 | B2* | 1/2018 | Romano | G06F 3/0317 |
| 2007/0019909 | A1* | 1/2007 | Yamauchi | G02B 27/1093 |
| | | | | 385/37 |
| 2009/0185274 | A1* | 7/2009 | Shpunt | G02B 27/0944 |
| | | | | 359/558 |
| 2013/0038881 | A1* | 2/2013 | Pesach | G01B 11/25 |
| | | | | 356/610 |
| 2013/0322683 | A1* | 12/2013 | Jacobs | G02B 27/0149 |
| | | | | 382/103 |
| 2014/0112573 | A1* | 4/2014 | Francis, Jr. | G06T 7/55 |
| | | | | 382/154 |
| 2014/0267623 | A1* | 9/2014 | Bridges | H04N 13/204 |
| | | | | 348/46 |
| 2014/0376092 | A1* | 12/2014 | Mor | G01B 11/2513 |
| | | | | 359/569 |
| 2015/0015701 | A1* | 1/2015 | Yu | G01B 11/2513 |
| | | | | 348/136 |
| 2015/0097947 | A1* | 4/2015 | Hudman | G01S 17/89 |
| | | | | 348/136 |
| 2016/0006914 | A1* | 1/2016 | Neumann | G01S 7/4817 |
| | | | | 348/78 |
| 2016/0050401 | A1* | 2/2016 | Gordon | G01C 3/02 |
| | | | | 348/744 |
| 2016/0072258 | A1* | 3/2016 | Seurin | G06K 9/00134 |
| | | | | 348/46 |
| 2016/0180574 | A1* | 6/2016 | Kaminitz | G06T 11/60 |
| | | | | 345/633 |
| 2016/0209729 | A1 | 7/2016 | Hudman | |
| 2016/0223828 | A1* | 8/2016 | Abraham | G06K 9/2036 |
| 2016/0321502 | A1* | 11/2016 | Kamath | G06Q 30/00 |
| 2017/0195654 | A1* | 7/2017 | Powers | G06T 7/521 |
| 2018/0035101 | A1* | 2/2018 | Osterhout | G02B 27/017 |
| 2018/0231373 | A1* | 8/2018 | Pesach | G01B 11/25 |

OTHER PUBLICATIONS

PCT International Search Report, PCT Application No. PCT/US2017/041870, dated Oct. 26, 2017, 17 pages.

European Extended Search Report, European Application No. 17182282.8, dated Jan. 2, 2016, 9 pages.

Kress, B. et al., "Structured IR Illumination for Relative Depth Sensing in Virtual Interfaces," Photonic Applications for Aerospace, Transportation and Harsh Environment III, Proc. of SPIE, May 11, 2012, pp. 1-9, vol. 8368, No. 1.

* cited by examiner

MULTIPLE EMITTER ILLUMINATION SOURCE FOR DEPTH INFORMATION DETERMINATION

BACKGROUND

The present disclosure generally relates to virtual or augmented reality systems and more specifically relates to an illumination source including a plurality of emitters in a depth camera assembly used to determine depth information of a local area.

Virtual reality (VR) systems or augmented reality (AR) systems, can leverage the capture of the environment surrounding a user in three dimensions (3D). However, traditional depth camera imaging architectures are comparably large in size, heavy, and consume significant amounts of power. Example depth camera imaging architectures for obtaining 3D information of a scene include e.g., stereo vision, time-of-flight (ToF) and structured light (SL). Different depth camera imaging architectures provide different strengths and weaknesses, so certain depth camera imaging architectures may provide better performance than others in different operating conditions. For instance, stereo vision architectures operate well with ambient illumination, while ToF architectures having an active illumination source which may be impaired by limitations in signal-to-noise ratio from ambient illumination. However, because of the relatively large size of conventional depth camera imaging architectures, many systems including a depth camera typically use a single type of depth camera imaging architecture configured for a particular use case. As head-mounted systems are increasingly used to perform a broader range of functions in varied operating conditions and environments, selecting a depth camera imaging architecture to obtain depth information of an area surrounding the head-mounted system and user may use more capability and flexibility within the same volume and weight limitations otherwise imposed.

SUMMARY

A depth camera assembly (DCA) that captures data describing depth information in a local area surrounding the DCA. The DCA includes an imaging device, a controller, and an illumination source. The illumination source includes a plurality of emitters located on a single substrate. The imaging device captures images of the local area illuminated with the light from one or more of the plurality of emitters. The images may be used by, e.g., a controller and/or a virtual reality console to determine depth information for the local area via a variety of techniques including, e.g., stereo vision, photometric stereo, structured light (SL), time-of-flight (ToF), or some combination thereof. The controller and/or a virtual reality console determines depth information for objects in the local area using the images. In some embodiments, the DCA is part of a head-mounted display (HMD) that includes an electronic display element and an optics block. The electronic display element displays a virtual object based in part on the depth information, and the optics block directs light from the electronic display element to an exit pupil of the HMD.

The illumination source includes a plurality of emitters that each emits light having certain characteristics. A characteristic is a feature that describes light emitted from an emitter. A characteristic may be, e.g., polarization, range of wavelengths, amplitude, temporal modulation, some other property of the emitted light, or a combination thereof. In some embodiments, the plurality of emitters have the same characteristics. In other embodiments, one or more of the characteristics differ between at least two of the plurality of emitters.

A common substrate is used to hold the plurality of emitters as part of the illumination source. Therefore, locations of each emitter may be determined based in part on extreme precision of a lithographic (e.g. semiconductor fabrication) process used to form the emitters on the single substrate. Additionally, because the emitters are on the same substrate, made in the same process, and are very close together, they are resilient to temperature change (and large temperature swings can be calibrated out easier), environment shocks, and other impacts.

Additionally, in some embodiments, one or more optical elements (e.g., collimation lens and/or diffractive optical element) may be shared between one or more of the plurality of emitters. If a lens moves, it causes a linear effect on all of the emitters that share the optical element, which may be corrected more easily than individually aligning an emitter to a corresponding optical element. In some embodiments, each emitter is comparable in overall power and goes through a common optical path to increase the resiliency of the system calibration to potential uncalibrated shifts after production. In some embodiments, multiple emitters are collimated and sent through a diffractive optical element (e.g., for SL applications) resulting in a known and stable offset for the pattern origin, which can improve depth information retrieval as described below.

Reliance on relative and absolute location between the emitters, and not absolute location between the emitters and the imaging device can help the DCA perform in even adverse environments. This allows for a more stable calibration, especially over its lifetime with the end-user (where depth retrieval accuracy is limited by knowledge of the emitter location whether virtual or real). Slightly different spacings between emitters (whether purposeful and/or within engineering tolerances) produces known offsets in, e.g., produced SL patterns.

Additionally, by alternating or using multiple emitters through time, relative pattern shift between emitters may improve determination of depth information (accuracy, precision, and density of data retrieval in a given scene). In addition, by operating multiple emitters concurrently, SL density can be increased. In addition, this can improve ToF (temporal modality) when more dense and uniform illumination is often better. Additionally, one or more of the plurality of emitters may be configured to act as a "spare" emitter that may be activated in the event of failure of one or more other emitters in the illumination source.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
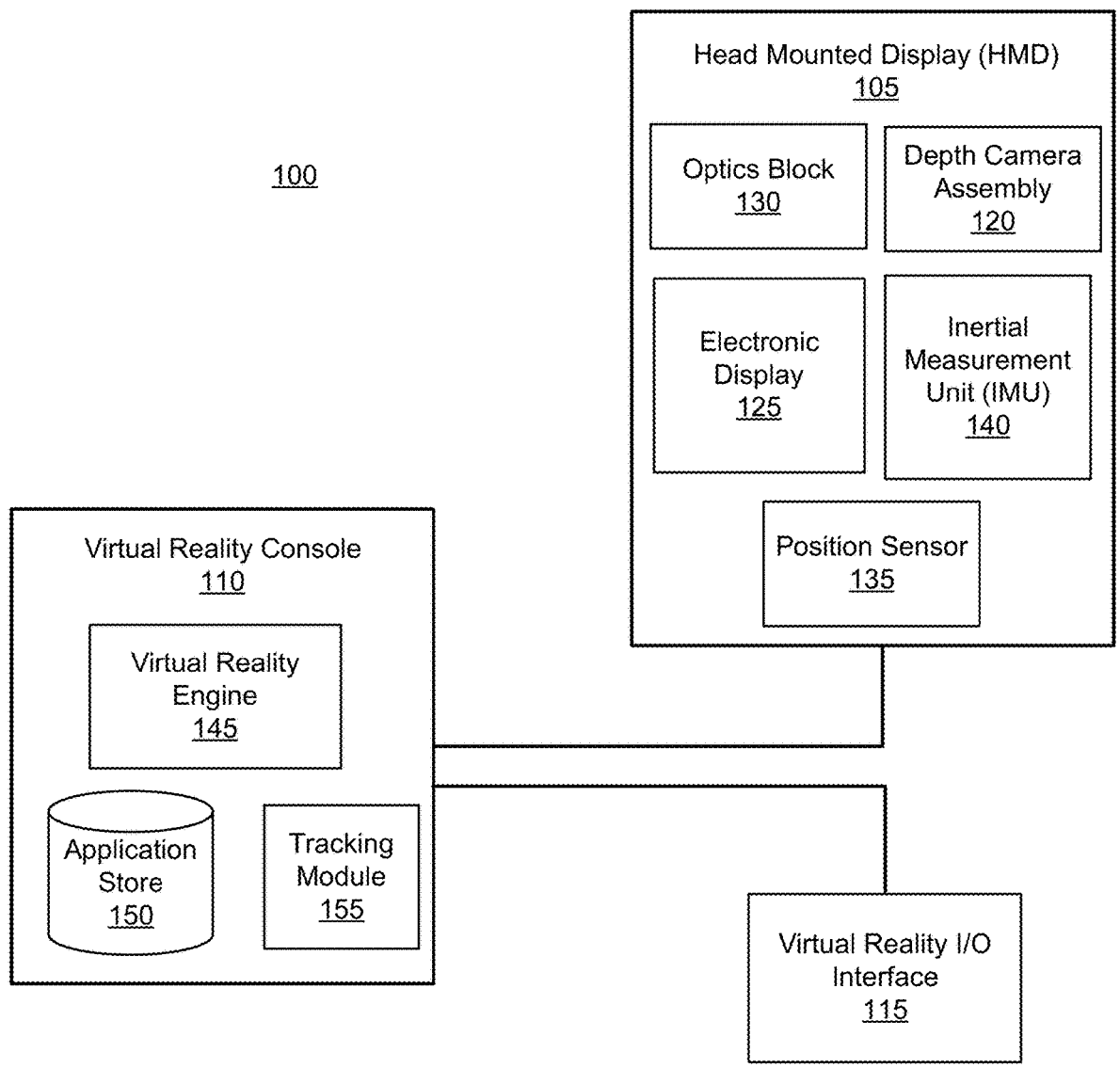
FIG. 1 is a block diagram of a system environment including a virtual reality system, in accordance with an embodiment.

FIG. 1 is a block diagram of one embodiment of a virtual reality (VR) system environment 100 in which a VR console 110 operates. While FIG. 1 shows a VR system environment for purposes of illustration, the components and functionality described herein may also be included in an augmented reality (AR) or mixed reality (MR) system in various embodiments. As used herein, a VR system environment 100 may also include virtual reality system environments that present users with virtual environments with which the user may interact. The VR system environment 100 shown by FIG. 1 comprises a head mounted display (HMD) 105 and a VR input/output (I/O) interface 115 that is coupled to a VR console 110. While FIG. 1 shows an example system 100 including one HMD 105 and one VR I/O interface 115, in other embodiments any number of these components may be included in the VR system environment 100. For example, there may be multiple HMDs 105 each having an associated VR I/O interface 115, with each HMD 105 and VR I/O interface 115 communicating with the VR console 110. In alternative configurations, different and/or additional components may be included in the VR system environment 100. Additionally, functionality described in conjunction with one or more of the components shown in FIG. 1 may be distributed among the components in a different manner than described in conjunction with FIG. 1 in some embodiments. For example, some or all of the functionality of the VR console 110 is provided by the HMD 105.

The HMD 105 is a head-mounted display that presents content to a user comprising virtual and/or augmented views of a physical, real-world environment with computer-generated elements (e.g., two dimensional (2D) or three dimensional (3D) images, 2D or 3D video, sound, etc.). In some embodiments, the presented content includes audio that is presented via an external device (e.g., speakers and/or headphones) that receives audio information from the HMD 105, the VR console 110, or both, and presents audio data based on the audio information. The HMD 105 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other.

The HMD 105 includes a depth camera assembly (DCA) 120, an electronic display 125, an optics block 130, one or more position sensors 135, and an inertial measurement Unit (IMU) 140. Some embodiments of The HMD 105 have different components than those described in conjunction with FIG. 1. Additionally, the functionality provided by various components described in conjunction with FIG. 1 may be differently distributed among the components of the HMD 105 in other embodiments.

The DCA 120 captures data describing depth information of an area surrounding the HMD 105. The data describing depth information may be associated with one or a combination of the following techniques used to determine depth information: stereo vision, photometric stereo, SL, and ToF. The DCA 120 can compute the depth information using the data, or the DCA 120 can send this information to another device such as the VR console 110 that can determine the depth information using data from the DCA 120.

The DCA 120 includes an illumination source, an imaging device, and a controller. The illumination source emits light onto an area surrounding the HMD. The illumination source includes a plurality of emitters on a single substrate. The imaging device captures ambient light and light from one or more emitters of the plurality of emitters of the plurality of emitters that is reflected from objects in the area. The controller coordinates how the illumination source emits light and how the imaging device captures light. In some embodiments, the controller may also determine depth information associated with the local area using the captured images.

The illumination source includes a plurality of emitters that each emit light having certain characteristics (e.g., wavelength, polarization, coherence, temporal behavior, etc.). The characteristics may be the same or different between emitters, and the emitters can be operated simultaneously or individually. In one embodiment, the plurality of emitters could be a vertical-cavity surface-emitting laser (VCSEL) array. In another embodiment, the plurality of emitters could be an array of single-mode edge emitter lasers, which can output orders of magnitude more power than any given single mode VCSEL. A common substrate is used to hold the plurality of emitters as part of the illumination source, allowing for precise determinations of each emitter location. Each emitter location is known and offset from neighboring emitters by a distance on the magnitude of tens to thousands of micrometers (in X-axis, Y-axis, and/or Z-axis). Each emitter at a different origination point behind a common or discrete optical system produces known offsets in, e.g., produced SL patterns. The pattern offsets may be useful in depth information determination, such as improving resolution, accuracy, and precision limits. Moreover, because the emitters are on the same substrate, made in the same or similar process steps, and are very close together, they are resilient to temperature change (where large temperature swings can be calibrated out easier) and environment shocks/impacts. Additionally, by alternating or using multiple emitters through time, relative pattern shifts between emitters may improve determination and resiliency of depth information. In addition, by operating multiple emitters concurrently, SL density can be increased. This may help with ToF (temporal modality) when more even illumination is often better, and assisted stereo methods when more structure in the scene illumination is useful. Additionally, one or more of the plurality of emitters may be configured to act as a "spare" emitter that may be activated in the event of failure of one or more other emitters in the illumination source. Additional detail regarding operation of the DCA 120 is discussed below with regard to FIG. 3.

The electronic display 125 displays 2D or 3D images to the user in accordance with data received from the VR console 110. In various embodiments, the electronic display 125 comprises a single electronic display or multiple electronic displays (e.g., a display for each eye of a user). Examples of the electronic display 125 include: a liquid crystal display (LCD), an organic light emitting diode (OLED) display, an active-matrix organic light-emitting diode display (AMOLED), some other display, or some combination thereof.

The optics block 130 magnifies image light received from the electronic display 125, corrects optical errors associated with the image light, and presents the corrected image light to a user of the HMD 105. In various embodiments, the optics block 130 includes one or more optical elements. Example optical elements included in the optics block 130 include: an aperture, a Fresnel lens, a convex lens, a concave lens, a filter, a reflecting surface, or any other suitable optical element that affects image light. Moreover, the optics block 130 may include combinations of different optical elements. In some embodiments, one or more of the optical elements in the optics block 130 may have one or more coatings, such as partially reflective or anti-reflective coatings.

Magnification and focusing of the image light by the optics block 130 allows the electronic display 125 to be physically smaller, weigh less and consume less power than larger displays. Additionally, magnification may increase the field of view of the content presented by the electronic display 125. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optics block 130 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the electronic display 125 for display is pre-distorted, and the optics block 130 corrects the distortion when it receives image light from the electronic display 125 generated based on the content.

The IMU 140 is an electronic device that generates data indicating a position of the HMD 105 based on measurement signals received from one or more of the position sensors 135 and from depth information received from the DCA 120. A position sensor 135 generates one or more measurement signals in response to motion of the HMD 105. Examples of position sensors 135 include: one or more accelerometers, one or more gyroscopes, one or more magnetometers, another suitable type of sensor that detects motion, a type of sensor used for error correction of the IMU 140, or some combination thereof. The position sensors 135 may be located external to the IMU 140, internal to the IMU 140, or some combination thereof.

Based on the one or more measurement signals from one or more position sensors 135, the IMU 140 generates data indicating an estimated current position of the HMD 105 relative to an initial position of the HMD 105. For example, the position sensors 135 include multiple accelerometers to measure translational motion (forward/back, up/down, left/right) and multiple gyroscopes to measure rotational motion (e.g., pitch, yaw, roll). In some embodiments, the IMU 140 rapidly samples the measurement signals and calculates the estimated current position of the HMD 105 from the sampled data. For example, the IMU 140 integrates the measurement signals received from the accelerometers over time to estimate a velocity vector and integrates the velocity vector over time to determine an estimated current position of a reference point on the HMD 105. Alternatively, the IMU 140 provides the sampled measurement signals to the VR console 110, which interprets the data to reduce error. The reference point is a point that may be used to describe the position of the HMD 105. The reference point may generally be defined as a point in space or a position related to the HMD's 105 orientation and position.

The IMU 140 receives one or more parameters from the VR console 110. As further discussed below, the one or more parameters are used to maintain tracking of the HMD 105. Based on a received parameter, the IMU 140 may adjust one or more IMU parameters (e.g., sample rate). In some embodiments, certain parameters cause the IMU 140 to update an initial position of the reference point so it corresponds to a next position of the reference point. Updating the initial position of the reference point as the next calibrated position of the reference point helps reduce accumulated error associated with the current position estimated the IMU 140. The accumulated error, also referred to as drift error, causes the estimated position of the reference point to "drift" away from the actual position of the reference point over time. In some embodiments of the HMD 105, the IMU 140 may be a dedicated hardware component. In other embodiments, the IMU 140 may be a software component implemented in one or more processors.

The VR I/O interface 115 is a device that allows a user to send action requests and receive responses from the VR console 110. An action request is a request to perform a particular action. For example, an action request may be an instruction to start or end capture of image or video data or an instruction to perform a particular action within an application. The VR I/O interface 115 may include one or more input devices. Example input devices include: a keyboard, a mouse, a game controller, or any other suitable device for receiving action requests and communicating the action requests to the VR console 110. An action request received by the VR I/O interface 115 is communicated to the VR console 110, which performs an action corresponding to the action request. In some embodiments, the VR I/O interface 115 includes an IMU 140, as further described above, that captures calibration data indicating an estimated position of the VR I/O interface 115 relative to an initial position of the VR I/O interface 115. In some embodiments, the VR I/O interface 115 may provide haptic feedback to the user in accordance with instructions received from the VR console 110. For example, haptic feedback is provided when an action request is received, or the VR console 110 communicates instructions to the VR I/O interface 115 causing the VR I/O interface 115 to generate haptic feedback when the VR console 110 performs an action.

The VR console 110 provides content to the HMD 105 for processing in accordance with information received from one or more of: the DCA 120, the HMD 105, and the VR I/O interface 115. In the example shown in FIG. 1, the VR console 110 includes an application store 150, a tracking module 155 and a VR engine 145. Some embodiments of the VR console 110 have different modules or components than those described in conjunction with FIG. 1. Similarly, the functions further described below may be distributed among components of the VR console 110 in a different manner than described in conjunction with FIG. 1.

The application store 150 stores one or more applications for execution by the VR console 110. An application is a group of instructions, that when executed by a processor, generates content for presentation to the user. Content generated by an application may be in response to inputs received from the user via movement of the HMD 105 or the VR I/O interface 115. Examples of applications include: gaming applications, conferencing applications, video playback applications, or other suitable applications.

The tracking module 155 calibrates the VR system environment 100 using one or more calibration parameters and may adjust one or more calibration parameters to reduce error in determination of the position of the HMD 105 or of the VR I/O interface 115. For example, the tracking module 155 communicates a calibration parameter to the DCA 120 to adjust the focus of the DCA 120 to more accurately determine positions of SL elements captured by the DCA 120. Calibration performed by the tracking module 155 also accounts for information received from the IMU 140 in the HMD 105 and/or an IMU 140 included in the VR I/O interface 115. Additionally, if tracking of the HMD 105 is lost (e.g., the DCA 120 loses line of sight of at least a threshold number of SL elements), the tracking module 140 may re-calibrate some or all of the VR system environment 100.

The tracking module 155 tracks movements of the HMD 105 or of the VR I/O interface 115 using information from the DCA 120, the one or more position sensors 135, the IMU 140 or some combination thereof. For example, the tracking module 155 determines a position of a reference point of the HMD 105 in a mapping of a local area based on information from the HMD 105. The tracking module 155 may also determine positions of the reference point of the HMD 105 or a reference point of the VR I/O interface 115 using data indicating a position of the HMD 105 from the IMU 140 or using data indicating a position of the VR I/O interface 115 from an IMU 140 included in the VR I/O interface 115, respectively. Additionally, in some embodiments, the tracking module 155 may use portions of data indicating a position or the HMD 105 from the IMU 140 as well as representations of the local area from the DCA 120 to predict a future location of the HMD 105. The tracking module 155 provides the estimated or predicted future position of the HMD 105 or the VR I/O interface 115 to the VR engine 145.

The VR engine 145 generates a 3D mapping of the area surrounding the HMD 105 (i.e., the "local area") based on information received from the HMD 105. In some embodiments, the VR engine 145 determines depth information for the 3D mapping of the local area based on information received from the DCA 120 that is relevant for techniques used in computing depth. The VR engine 145 may calculate depth information using one or more techniques in computing depth (e.g., stereo vision, photometric stereo, SL, ToF, or some combination thereof). In various embodiments, the VR engine 145 uses different types of information determined by the DCA 120 or a combination of types of information determined by the DCA 120.

The VR engine 145 also executes applications within the VR system environment 100 and receives position information, acceleration information, velocity information, predicted future positions, or some combination thereof, of the HMD 105 from the tracking module 155. Based on the received information, the VR engine 145 determines content to provide to the HMD 105 for presentation to the user. For example, if the received information indicates that the user has looked to the left, the VR engine 145 generates content for the HMD 105 that mirrors the user's movement in a virtual environment or in an environment augmenting the local area with additional content. Additionally, the VR engine 145 performs an action within an application executing on the VR console 110 in response to an action request received from the VR I/O interface 115 and provides feedback to the user that the action was performed. The provided feedback may be visual or audible feedback via the HMD 105 or haptic feedback via the VR I/O interface 115.

Figure 2:
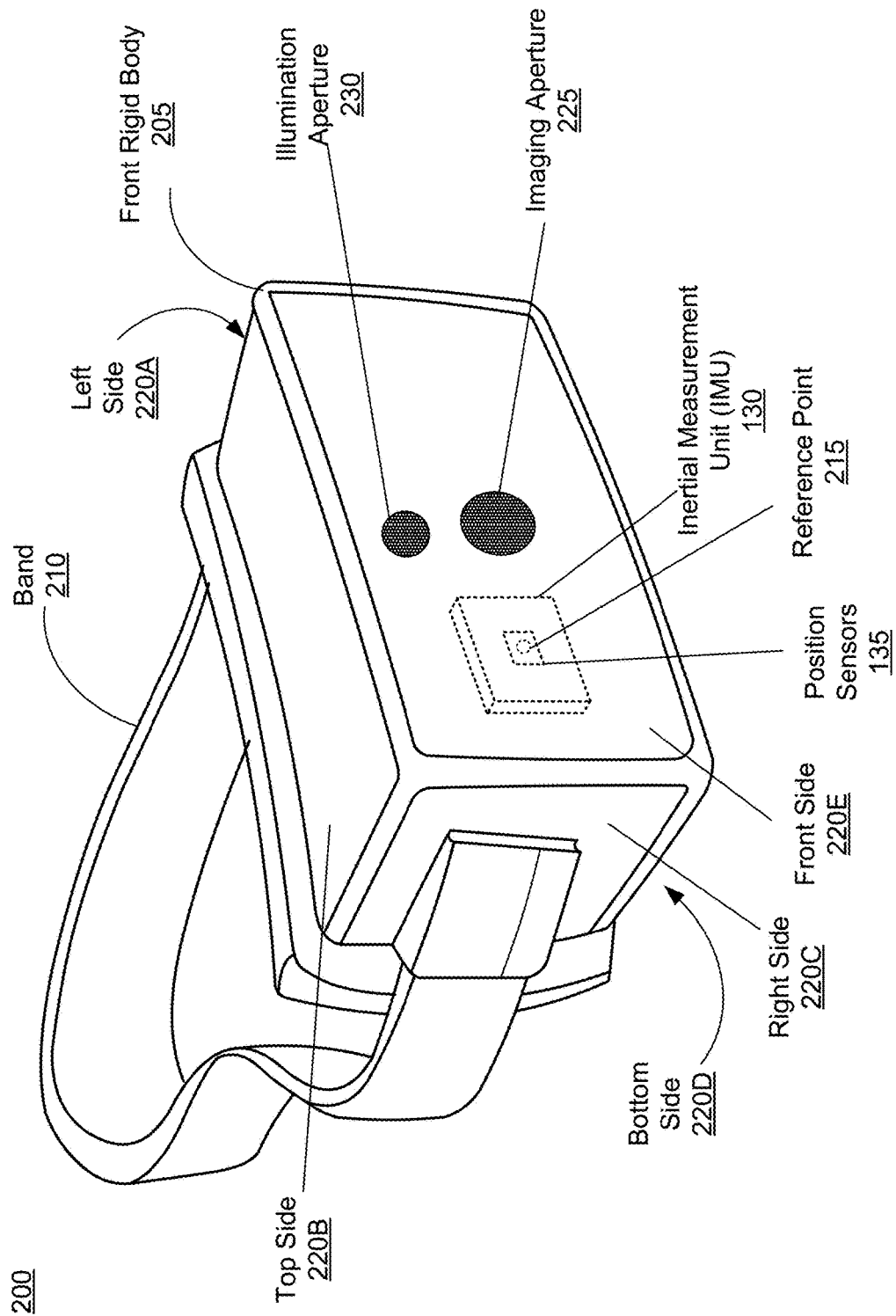
FIG. 2 is a diagram of a head-mounted display, in accordance with an embodiment.

FIG. 2 is a wire diagram of one embodiment of a HMD 200. The HMD 200 is an embodiment of the HMD 105, and includes a front rigid body 205, a band 210, a reference point 215, a left side 220A, a top side 220B, a right side 220C, a bottom side 220D, and a front side 220E. The HMD 200 shown in FIG. 2 also includes an embodiment of a depth camera assembly (DCA) 120 and depicts an imaging aperture 225 and an illumination aperture 230. Some embodiments of the DCA 120 include an imaging device, and an illumination source. The illumination source emits light through an illumination aperture 230. The imaging device captures light from the illumination source and ambient light in the local area through an imaging aperture 225. The front rigid body 205 includes one or more electronic display elements of the electronic display 125 (not shown), the IMU 130, the one or more position sensors 135, and the reference point 215.

Figure 3:
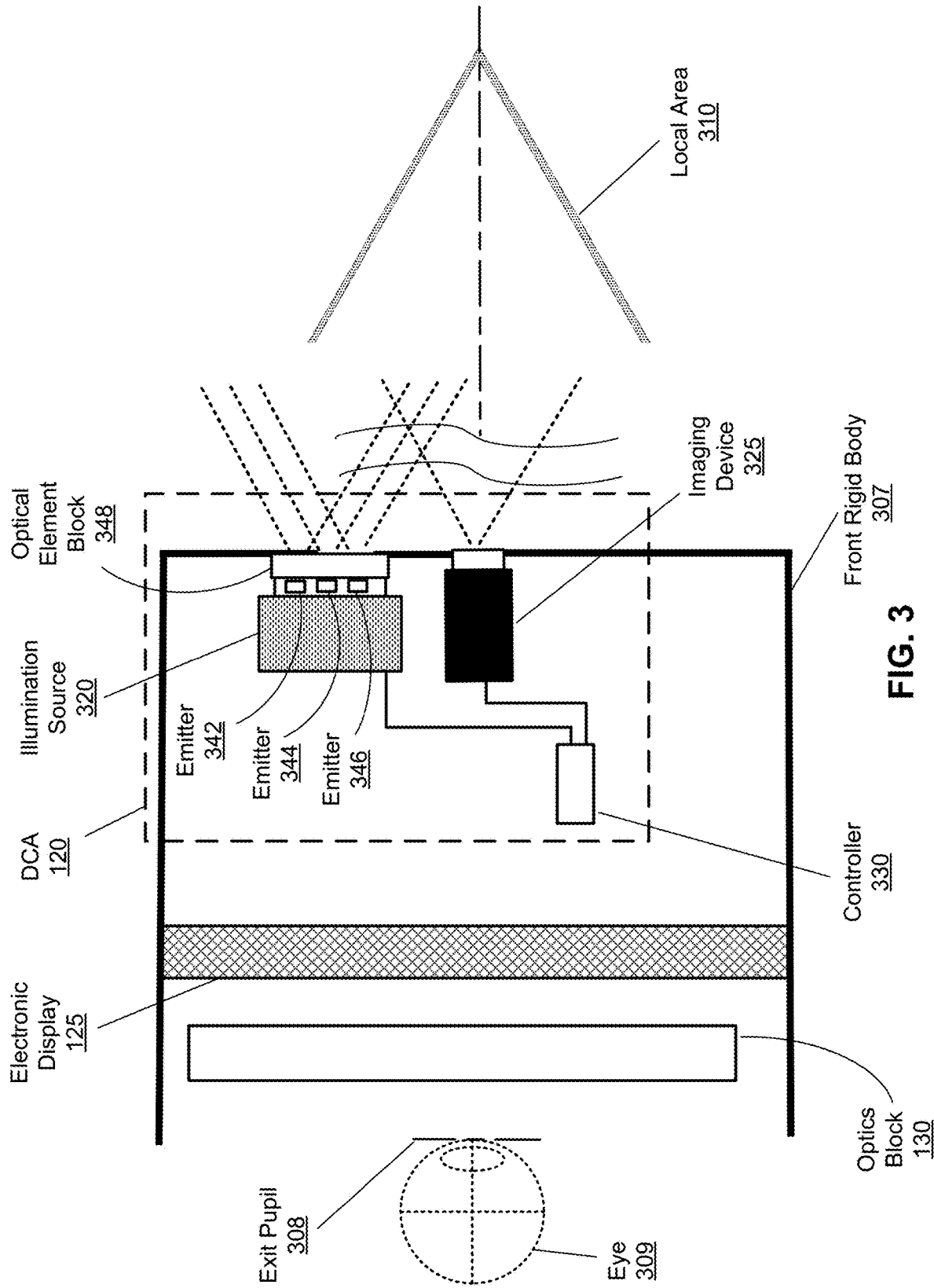
FIG. 3 is a cross section of a front rigid body of a head-mounted display, including a depth camera assembly in accordance with an embodiment.

FIG. 3 is a cross section 300 of an HMD 305, in accordance with an embodiment. In some embodiments, the HMD 305 is an embodiment of the HMD 105. In other embodiments it is part of some other HMD. The front rigid body 307 includes a depth camera assembly (DCA) 120, an electronic display 125, and an optics block 130. Some embodiments of the HMD 305 have different components than those described here. Similarly, in some cases, functions can be distributed among the components in a different manner than is described here. The front rigid body 307 also includes an exit pupil 308 where an eye 309 of a user would be located. For purposes of illustration, FIG. 3 shows a cross section of the front rigid body 307 in accordance with a single eye 309. Although FIG. 3 depicts a center cross-section of the eye 309 as being in the same plane as the DCA 120, the center cross-section of the eye 309 and the DCA 120 do not have to be in the same plane. Additionally, another electronic display 125 and optics block 130, separate from those shown in FIG. 3, may be included in the front rigid body 307 to present content, such as an augmented representation of a local area 310 or virtual content, to another eye of the user.

The depth camera assembly (DCA) 120 includes an illumination source 320, an imaging device 325, and a controller 330. The illumination source 320 illuminates the local area 310 with light. The local area 310 is an area surrounding the HMD 105 and includes objects in a field of view of the imaging device 325. The illumination source 320 includes a plurality of emitters on a single substrate that emit light onto the local area 310. In one embodiment, the illumination source 320 includes emitter 342, emitter 344, and emitter 346. A typical emitter could be a laser diode made by a semiconductor fabrication process. A plurality of laser diodes could be made on a single substrate, and maintained in as-fabricated orientation (common structure carrier, inheriting semiconductor/lithographic precision) in the illumination source 320. In one embodiment, spacing between laser diodes may be 50 to 250 microns. In other embodiments, the spacing between laser diodes ranges from 0.3 mm to 1.5 mm. Neighboring emitters in the illumination source 320 may be spaced equally or in some embodiments, unequally. For example, in one embodiment the distance between emitter 342 and emitter 344 is the same as the distance between emitter 344 and emitter 346. However, in another embodiment, the distance between emitter 342 and emitter 344 is a different distance than the distance between emitter 344 and emitter 346, for example 0.2 versus 1.0 mm respectively. Since the plurality of emitters are on the same substrate, shifts in location of the illumination source due to events such as temperature changes, environment shocks, or environmental impacts may similarly affect the plurality of emitters. The shifts can be correlated based upon the differences in the retrieved images of patterns from each emitter in the illumination source 320, and the depth retrieval accuracy can be improved by knowledge of the change in location of the illumination source 320. In addition, because each emitter is geometrically separated by micrometers to millimeters and has few or no interfaces in the structural support, it may be resilient to any gradients in the system, which can otherwise effect performance in a non-linear and hard to predict manner.

Each emitter 342, 344, 346, emits light having certain characteristics. A characteristic is a feature that describes light emitted from an emitter. A characteristic may be e.g., polarization, range of wavelengths, amplitude, temporal modulation, some other feature that describes emitted light, or some combination thereof. In some embodiments, the plurality of emitters all have the same characteristics. In other embodiments, one or more of the characteristics may be different in each emitter from other emitters in the illumination source 320. A range of wavelengths is generally some portion of a band of light. Example bands of light emitted by the illumination source 320 include: a visible band (~380 nm to 750 nm), an infrared (IR) band (~750 nm to 1500 nm), an ultraviolet band (100 nm to 380 nm), another portion of the electromagnetic spectrum, or some combination thereof. For example, in some embodiments the emitter 342, the emitter 344, and the emitter 346 all emit the same range of wavelengths (e.g., near 950 nm). In alternate embodiments, the emitter 342 emits in the visible band, the emitter 344 emits in a sub-region of the IR band (for example 850 nanometers), and the emitter 346 emits in another portion of the IR band (for example 940 nanometers). Similarly other characteristics may vary or be the same between emitters in the illumination source 320. For example, emitter 342 and emitter 344 could emit circularly polarized light in a first portion of the IR band, and emitter 346 could emit linearly (vertically) polarized light at a second portion of the IR band.

The illumination source 320 includes an optical element block 348 that includes one or more optical elements common to the plurality of emitters. The optical elements may be, e.g., a diffractive optical element (DOE), a collimation lens, a mask that when illuminated creates a SL pattern, etc. A DOE may be e.g., a Fresnel lens, a diffraction grating, some other DOE, or some combination thereof.

For example, in one embodiment the one or more optical elements includes a common collimator lens and DOE, where the emitter 342, the emitter 344, and the emitter 346 emit light through the DOE to create structured light (e.g., the DOE is common to the emitter 342, the emitter 344, and the emitter 346). The structured light produced is a specified pattern, such as a symmetric or quasi-random dot pattern, grid, or horizontal bars. Within the center region of the field of view, the density of the specified pattern can increase as additional emitters are activated. In addition, based upon the emitter spacing, the apparent field of view for the structured light pattern can increase, as the output pattern may appear to be copied and shifted in angular coordinates after going through the DOE. For example, in one embodiment the DOE may create a dot pattern. When emitter 342 is activated, a first dot pattern is produced. When emitter 344 is active, a second dot pattern is produced, similar to the first dot pattern, but shifted in both spatial origin and projected angular axis location in the corresponding local area 310. Thus, activating both emitter 342 and emitter 344 at the same time produces two dot patterns, approximately twice the density of the dot pattern (if so utilized) produced by a single emitter where the dot patterns overlap, and otherwise may increase the illumination field of view.

The optical element block 348 of illumination source 320 may include one or more optical elements that correspond to different emitters of the plurality of emitters. For example, in one embodiment the emitter 342 emits light through a first DOE to produce a grid pattern, and the emitter 344 emits light through a second DOE to produce a horizontal bar pattern.

The imaging device 325 captures images of the local area 310. The imaging device 325 may include one or more detectors and one or more optical elements (e.g., one or more lenses, a diffractive element, a wavelength filter, a polarizer, an aperture, or some combination thereof). The imaging device 325 may capture and record particular bands of light or specific polarizations of light. For example, the imaging device 325 may capture images including light in the visible band and in the infrared band. The imaging device 325 may capture images including light of specific polarizations (e.g. circularly, linearly polarized light). In some embodiments, the imaging device 325 may include a lens array that presents multiple images of the local area across different regions of a detector of the imaging device 325.

In some embodiments, the controller 330 is configured to determine depth information for objects in the local area 310 using the one or more images. The controller 330 controls how light is emitted from the illumination source 320 and how the imaging device 325 captures light. For example, the controller 330 instructs one or more emitters in the illumination source 320 to emit light. In this manner, the controller 330 controls properties such as timing, intensity, wavelength range, polarization, field of view limits, and density (in the case of SL) of the illumination source 320. The controller 330 can also control the timing of when data is collected from the imaging device 325. Thus, the controller 330 can coordinate the capturing of data by the imaging device 325 with light emission by the illumination source 320. In alternate embodiments, some other device (e.g., VR console 110) determines depth information for the local area.

In some embodiments, the controller 330 is configured to determine depth information based in part on the technique employed for capturing depth information. For example, the depth information could be determined by using one or a combination of the following techniques: stereo vision, photometric stereo, SL, and ToF.

The controller may also cause the DCA 120 to capture depth information using a (active or assisted) stereo vision technique. In one embodiment, the controller 330 controls two or more detectors from the imaging device 325 to capture light reflected off of the local area 310. The detectors of imaging device 325 are located a fixed distance apart from each other and can be used to extract depth information. Each detector collects light that is reflected from the local area 310 (e.g., one or more objects in the local area 310). In an alternative embodiment, the controller 330 coordinates the emitting of light from the illumination source 320 with the collection of light from two or more detectors of the array detector 325. The data collected by the controller 330, which contains data from different vantage points, can be compared to determine depth information.

The controller 330 may also cause the DCA 120 to capture depth information using a photometric stereo technique. The controller 330 coordinates the emitting of light from two or more emitters of the plurality of emitters with the collection of light from the imaging device 325. The data collected by the controller, which includes data with different lighting conditions, can be used to determine depth of objects in the local area 310.

The controller 330 may also cause the DCA 120 to capture depth information using a SL technique. In one embodiment, the controller 330 controls an illumination source 320 to emit SL with a specific pattern onto the local area 310. The controller 330 can turn on one or more emitters of the illumination source 320 to increase the density, field of view, or baseline of the specific pattern. For example, the controller may activate more emitters if the local area 310 includes an object with fine detail. The controller 330 coordinates the emitting of the SL from the illumination source 320 with the collection of light by the imaging device 325. The data collected by the controller 330, which includes SL information, can be used to determine depth of objects in the local area 310. The controller 330 can also activate each emitter at different times and use the imaging device 325 to capture multiple images for the multiple emitters, improving the accuracy of depth determination.

The controller 330 may also cause the DCA 120 to capture depth information using a ToF technique. In one embodiment, the controller 330 controls the time when one or more emitters are activated in the illumination source 320, and effectively measures the accumulated phase offset (comparable to time difference) it takes for the emitted light to be reflected from the local area 310 and detected by the imaging device 325. The data collected by the controller 330, which includes ToF information, can be used to determine depth of objects in the local area 310.

Figure 4:
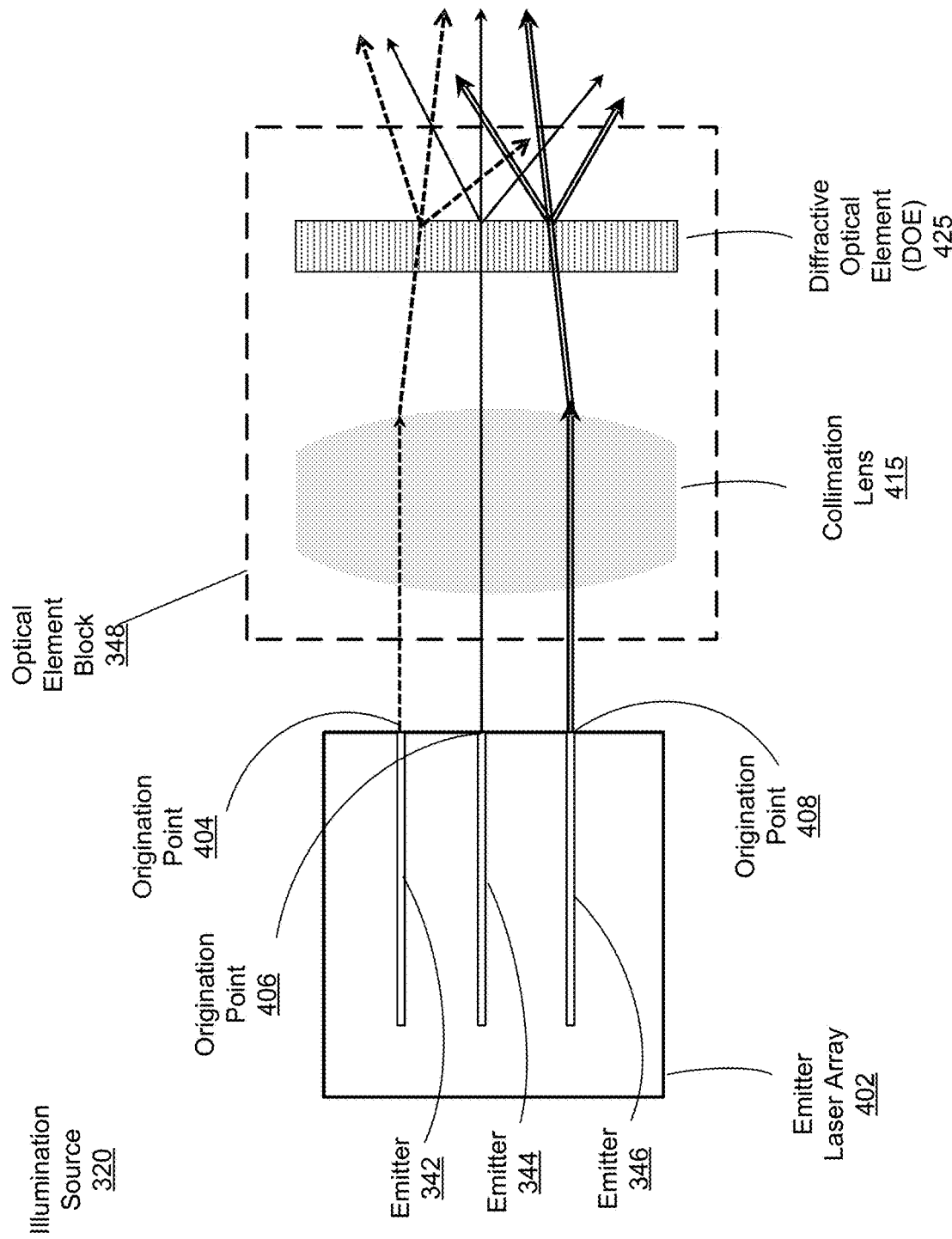
FIG. 4 is a cross section of the illumination source in accordance with an embodiment.

FIG. 4 is a cross section of the illumination source 320 in accordance with an embodiment. In this embodiment, the emitter 342, the emitter 344, and the emitter 346 are part of an emitter laser array 402 and the optical element block 348 includes a collimation lens 415 and a DOE 425 that is common to the laser array. The emitters 342, the emitter 344, and the emitter 346 of the emitter laser array 402 emit light exiting the corresponding laser cavity at the origination point 404, origination point 406, and origination point 408, respectively. This emitted light is then collimated by a common collimation lens 415 and goes through a common DOE 425 to create SL.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A depth camera assembly (DCA) comprising:
   an illumination source comprising a plurality of emitters including a first emitter and a second emitter on a single substrate, the illumination source configured to project light into a local area using two or more of the plurality of emitters, the illumination source further comprising:
      a first diffractive optical element corresponding to the first emitter, the first emitter configured to generate a first structured light pattern using the first diffractive optical element, and
      a second diffractive optical element corresponding to the second emitter, the second emitter configured to generate a second structured light pattern using the second diffractive optical element,
      wherein the illumination source is configured to activate the first emitter and second emitter separately, or activate the first and second emitters concurrently to produce a light pattern that combines the first and second structured light patterns, and
      wherein the first structured light pattern is a dot pattern and the second structured light pattern is a bar pattern;
   an imaging device configured to capture images of the local area illuminated with the light from the illumination source; and
   a controller configured to determine depth information for objects in the local area using the images from the imaging device.

2. The DCA of claim 1, wherein the DCA is part of a head mounted display (HMD) comprising:
   an electronic display element configured to display a virtual object based in part on the depth information; and
   an optics block configured to direct light from the electronic display element to an exit pupil of the HMD.

3. The DCA of claim 1, wherein neighboring emitters of the plurality of emitters are separated by a same distance.

4. The DCA of claim 1, wherein at least one set of neighboring emitters are separated by a different distance than another set of neighboring emitters in the plurality of emitters.

5. The DCA of claim 1, wherein the controller is further configured to:
- activate the first emitter to emit light for a first period of time that is used to generate the first structured light pattern in the local area using the first diffractive optical element; and
- activate the second emitter to emit light for a second period of time that is subsequent to the first period of time, the emitted light being used to generate the second structured light pattern in the local area using the second diffractive optical element.

6. The DCA of claim 1, wherein the controller is further configured to:
- activate the first emitter and the second emitter to emit light for a period of time, the emitted light being used to generate structured light patterns.

7. The DCA of claim 1, wherein each emitter emits light described by one or more characteristics selected from a group consisting of: polarization, range of wavelengths, amplitude, temporal modulation, some other feature that describes emitted light, and some combination thereof.

8. The DCA of claim 7, wherein the characteristics of the emitted light for each of the plurality of emitters are the same.

9. The DCA of claim 7, wherein at least one of the characteristics of the emitted light from an emitter of the plurality of emitters is different from a corresponding characteristic of another emitter of the plurality of emitters.

10. The DCA of claim 1, wherein:
- the plurality of emitters on the single substrate share an optical path such that light emitting from different emitters passes through a common optical element.

* * * * *

UNITED STATES PATENT AND TRADEMARK OFFICE
CERTIFICATE OF CORRECTION

Page 1 of 1

PATENT NO.         : 10,827,163 B2
APPLICATION NO.    : 15/232073
DATED              : November 3, 2020
INVENTOR(S)        : Trail et al.

It is certified that error appears in the above-identified patent and that said Letters Patent is hereby corrected as shown below:

In the Claims

In Column 12, in Claim 1, Line 46, after "and" insert -- the --.

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*